Oct. 13, 1953 J. P. ECKERT, JR., ET AL 2,655,598

SIGNAL PROCESSING APPARATUS

Filed Oct. 21, 1950

INVENTOR.
JOHN W. MAUCHLY
JOHN PRESPER ECKERT JR.
George V. Eltgroth
ATTORNEY

Patented Oct. 13, 1953 2,655,598

UNITED STATES PATENT OFFICE 2,655,598

SIGNAL PROCESSING APPARATUS

John Presper Eckert, Jr., Gladwyne, and John W. Mauchly, Ambler, Pa., assignors to Eckert-Mauchly Computer Corporation, Philadelphia, Pa., a corporation of Pennsylvania Application October 21, 1950, Serial No. 191,404

4 Claims. (Cl. 250—27)

This invention relates to apparatus jointly responsive to signal groups arriving over a plurality of channels and more particularly to a signal responsive network of the type delivering at its output a signal reflecting properties present in all its input channels.

This invention provides an apparatus responsive to signal groups which arrive concurrently over a plurality of channels. The apparatus does not respond to each signal group individually, but jointly to all signal groups concurrently delivered by the several channels. The output signal group produced by the apparatus is determined by the energizing signal groups. In this way, the apparatus produces a response which is a signal group uniquely reflecting the properties of the signal groups arriving over the signal channels.

Accordingly, it is a principal object of the invention to provide a new and improved signal responsive circuit.

Another object of the invention is to provide a new and improved circuit responsive to a plurality of signal groups made up of impulses concurrently arriving over a plurality of signal channels.

A further object of the invention is to provide a new and improved circuit for producing unique output signals or impulse groups in response to a plurality of energizing signal impulse groups.

Yet a further object of the invention is to provide an impulse responsive circuit having high reliability and accuracy of response.

Figures 1, 2:
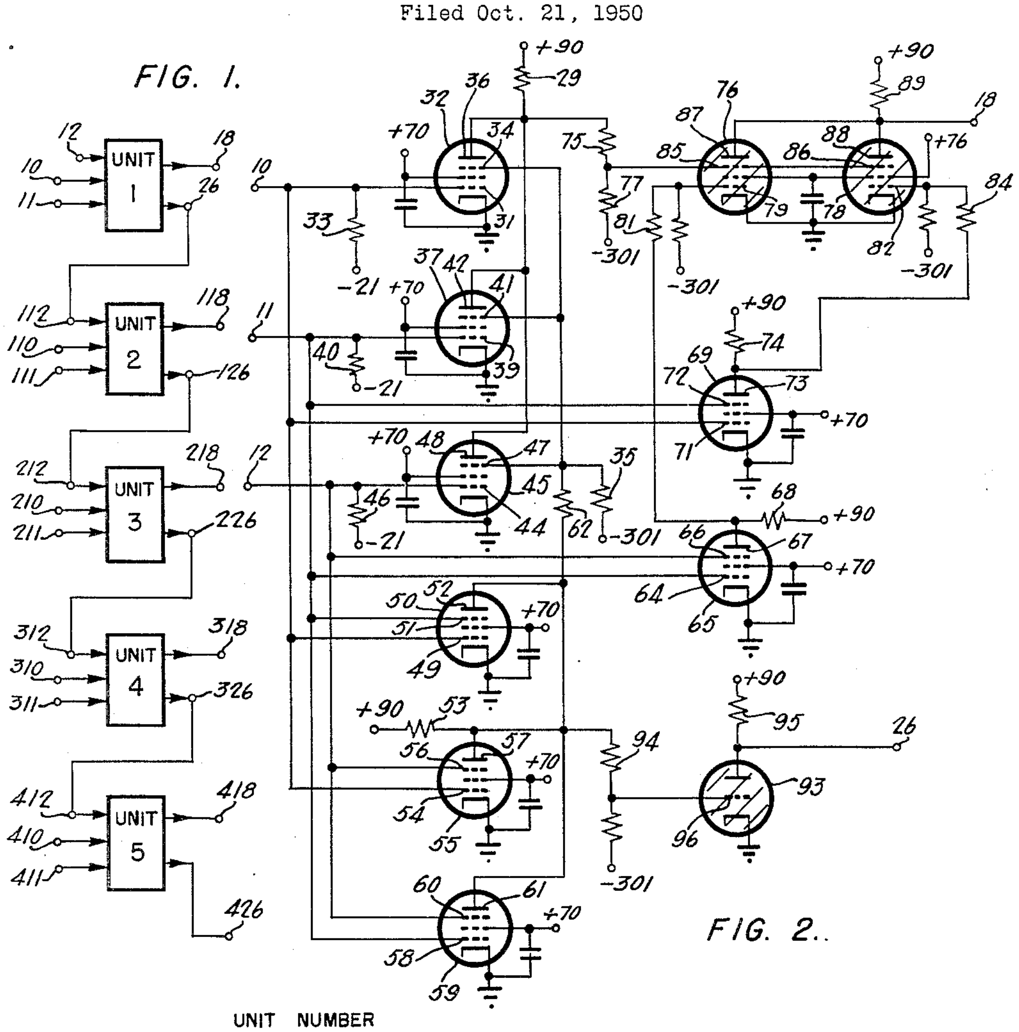
Figure 3:
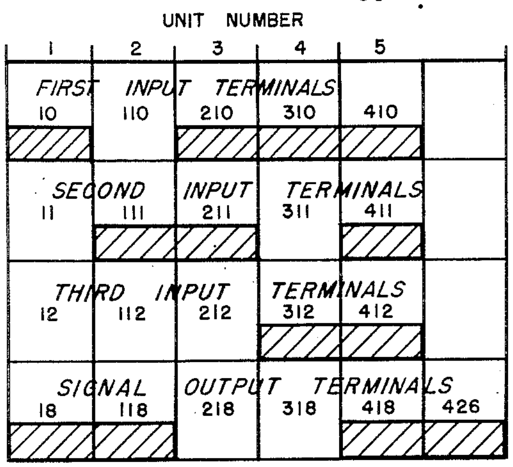

The foregoing and other objects of the invention will become more apparent as the following detailed description of the invention is read in conjunction with the drawings in which:

Figure 1 diagrammatically illustrates in block form a signal responsive network embodying the invention, Figure 2 illustrates schematically a signal responsive network conforming to a unit shown in block form by Figure 1, and Figure 3 illustrates in graphic form the signal response to input signals of the network shown in Figure 1.

In the annexed drawings like parts are identified by like reference characters and values of potential are given for purposes of illustration only and not in order to limit the scope of the invention.

For convenient reference, all supply buses are identified with a number corresponding with their voltage, even numbers being employed for positive voltages, and odd numbers for negative voltages.

Refer to Figure 1 which shows in block form a plurality of inter-connected units each comprising three input terminals and two output terminals. Each unit is characterized by delivering a signal on its first output terminal in response to a signal on any one of its input terminals. When two concurrent signals are delivered to any two of its three input terminals of a unit, an output signal is delivered over its second output terminal. If three concurrent signals are delivered to the three input terminals of a unit, output signals are delivered by both its first and second output terminals.

Circuits having the characteristic properties described above are disclosed in an application filed October 21, 1950 in the names of John W. Mauchly and John Presper Eckert, Jr., entitled Signal Responsive Network, identified by Serial No. 191,403. Disclosed therein are also networks adapted for response to negative input signals as well as networks responding to positive input signals. One of the networks disclosed in said application adapted to receive positive-going input signals and modified to respond statically to prolonged input signals, as well as dynamically to short impulses, will now be described.

Refer now to Figure 2 which schematically illustrates a signal responsive circuit conforming to the block representation of a unit in Figure 1. This circuit is adapted to receive positive-going signals over its input terminal 10, 11, and 12 and delivers positive signals over its output terminals 18 and 26.

The input terminal 10 is connected to the inner control electrode 31 of a buffer valve 32. The buffer valve 32 is normally nonconducting having its inner control electrode 31 returned to a negative potential bus 21 through a grid resistor 33. The buffer valve 32 has its cathode directly grounded, its auxiliary control grid 34 returned to a negative bus 301 through a resistor 35 and its screen electrode linked to a positive bus 70 and returned to ground potential through the normal bypass capacitor. The anode 36 of the buffer valve 32 is joined to a positive bus 90 by an anode resistor 29.

The signal input terminal 11 is joined to the inner control electrode 39 of a buffer valve 37. Buffer valve 37 is normally nonconducting and has its inner control electrode 39 returned to the negative potential bus 21 through a resistor 40 to negative bus 301 and its auxiliary control electrode 41 linked through the resistor 35. The anode 42 of valve 37 is also returned through the anode resistor 29 to the positive bus 90.

The signal input terminal 12 is connected to the inner control electrode 44 of a buffer valve 45. The valve 45 is normally nonconducting and has its inner control electrode 44 returned to negative bus 21 through a grid resistor 46, and its auxiliary control electrode 47 returned by the resistor 35 to negative bus 301. The anode 48 of valve 45 is also returned by the common anode resistor 29 to the positive bus 90.

The receipt of a positive impulse upon any one of the input terminals 10, 11, and 12 results in the respective valves 32, 37, 45 becoming conductive. Conduction of any one of these three valves results in the development of a negative-going signal upon their anodes by the increased voltage drop across the common anode resistor 29.

A gating valve 50 has its inner control electrode 49 connected to terminal 10, its auxiliary control electrode connected to terminal 11, while its screen electrode is linked to the positive bus 70 and bypassed to ground potential by the usual capacitor. The cathode of valve 50 is linked to ground and the anode 52 is returned to positive bus 90 through an anode resistor 53. The gating valve 50 is normally nonconducting and assumes conduction only when positive signals are concurrently present upon its related input terminals 10 and 11.

A second gating valve 55 is also normally nonconducting and has its inner control electrode 54 and auxiliary control electrode 56 respectively connecting to signal input terminals 10 and 12. The anode 57 of gating valve 55 is also returned by means of the anode resistor 53 to positive bus 90. The gating valve 55 becomes conductive only upon the concurrence of positive signals upon the input terminals 10 and 12.

A third gating valve 59 has its control electrodes 58 and 60 respectively connected to signal input terminals 11 and 12. The anode 61 of valve 59 is also connected to the positive bus 90 by the common anode resistor 53. The gating valve 59 is normally nonconducting and becomes conductive only upon the concurrence of positive signals on the signal input terminals 11 and 12.

The anode end of the resistor 53 is connected through a coupling resistor 62 with the auxiliary control electrodes 34, 41 and 47 respectively of buffer valves 32, 37 and 45.

Whenever two signals appear concurrently on any two of the signal input terminals 10, 11 and 12, a respective one of the gating valves 50, 55 and 59 assumes conduction. This results in the development of a negative-going signal at the anodes of these valves because of increased voltage drop across the load resistor 53 with increased current flow. This negative going signal is transmitted by the coupling resistor 62 to the auxiliary control electrodes of the buffer valves 32, 37 and 45 to prevent their conduction.

The valve 65 of the pair of signal coincidence valves 65 and 69, is normally nonconducting and has its control electrodes 64 and 66 respectively connected to signal input terminals 11 and 12 and its screen electrode joined to positive bus 70 and returned to ground potential by an ordinary bypass capacitor. The cathode of coincidence valve 65 is linked to ground potential and the anode 67 is returned to positive bus 90 through an anode resistor 68.

The signal coincidence valve 69 is also normally non-conducting and has its control electrodes 71 and 72 respectively connected to the input signal terminals 10 and 11. The anode 73 of this valve 69 is returned to positive bus 90 through an anode resistor 74.

The coincidence valve 65 develops a negative-going signal upon its anode 67 only when positive signals are concurrently present upon the signal input lines 11 and 12. The signal coincident valve 69 likewise develops a negative-going signal upon its anode 73 when it becomes conductive in response to positive input signals upon the terminals 10 and 11.

A pair of signal output valves 76 and 78 are respectively associated with the signal coincidence valves 65 and 69, as well as with the signal buffer valves 32, 37 and 45.

The signal output valve 76 has its inner control electrode 79 connected with the anode 67 of signal coincidence valve 65 through a coupling resistor 81. The signal output valve 76 which is normally conducting has its inner control electrode 79 also returned to negative bus 301 through the usual grid resistor while its cathode is directly joined to ground potential and its anode 87 returns to positive bus 90 through anode resistor 89.

The signal output valve 78 which is also normally conducting has its inner control electrode 82 similarly joined to the anode 73 of the signal coincidence valve 69 through a coupling resistor 84. The inner control electrode 82 of signal output valve 78 is also returned to negative bus 301 through the usual grid resistor while the cathode is directly linked to ground potential and the anode 88 is returned by the common anode resistor 89 to positive bus 90. The screen electrodes of valves 76 and 78 are linked to the positive bus 70 and returned to ground potential by a conventional bypass capacitor.

The auxiliary control electrodes 85 and 86 respectively of valves 76 and 78 are both connected by means of a coupling resistor 75 to the anode end of the resistor 29 which is associated with the buffer valves 32, 42, and 45. The auxiliary control electrodes 85 and 86 of valves 76 and 78 are returned to negative bus 301 through a grid resistor 77.

When any one of the buffer valves 32, 37 and 45 becomes conductive the negative impulse developed by the common resistor 29 is delivered to the auxiliary control electrodes 85 and 86 of valves 76 and 78. This negative signal cuts off both valves 76 and 78 which develops a positive-going signal at the anode end of the common anode resistor 89. This signal appears upon the signal output terminal 18.

As already noted, when two or more concurrent signals are delivered to the signal input terminals 10 and 11 and 12, the buffer valves 32, 37 and 45 are prevented from delivering an output signal. If three concurrent signals are delivered to each of the input terminals both signal coincidence valves 65 and 69 are rendered conductive. The negative signals developed in their anode circuits are delivered to a respective one of the signal output valves 76 and 78. This results in both valves 76 and 78 becoming nonconductive, which effects the delivery of a positive signal to the output terminal 18.

A signal output valve 93 has its control electrode 96 connected by a coupling resistor 94 to the anode end of the anode resistor 53 associated with the gating valves 50, 55 and 59. The signal output valve 93 which is normally conducting has its control electrode 96 returned to negative bus 301 through the usual grid resistor, its cathode directly linked to ground potential, and its anode returned through an anode resistor 95 to positive bus 90. The second signal output terminal 26 is directly linked to the anode of valve 93.

When at least two signals are concurrently delivery to the input terminals the resulting negative signal developed by the gating valve anode resistor 53 in addition to inhibiting the operation of the buffer valves delivers a negative input signal to the valve 93 rendering it nonconductive. A positive signal is developed by the anode resistor 95. This positive signal is delivered to the second output terminal 26.

The overall operation of this signal responsive network is as follows: If one signal is delivered to any one of the input terminals, a buffer valve signal is developed which is passed on to the output valves 76 and 78 to render them nonconductive which delivers a positive output signal to the output terminal 18.

If two signals are concurrently present upon any two of the signal input terminals, a negative signal developed in the gating valve circuit is delivered to the buffer valves inhibiting the development of negative signals in their anode circuit. This results in the absence of a signal over the output terminal 18. The negative signal developed by the gating circuit is also delivered to the output valve 93 which develops a positive output signal in its anode circuit. This signal is delivered at this time to the signal output terminal 26.

In the case where three input signals are concurrently present upon the input terminals, the action of the gating valves is similar to that discussed in the case of two concurrent input pulses. However, in this case, both of the coincidence valves 65 and 68 are activated to deliver negative cutoff signals to the signal output valves 76 and 78. This results in the nonconduction of the input valves and allows the delivery of a positive signal to the output terminal 18. Thus with the concurrent presence of three input signals on the input terminals, a signal is delivered to the output terminals 18 and 26.

Returning to Figure 1, note that unit 1 has first, second and third input terminals, 10, 11 and 12, and first and second output terminals, 18 and 26; unit 2 has first, second and third input terminals, 110, 111, and 112, and first and second output terminals 118 and 126; unit 3 has input terminals, 210, 211, and 212, and output terminals 218 and 226; unit 4 has input terminals 310, 311 and 312 and output terminals 318 and 326; and unit 5 has input terminals 410, 411 and 412, and output terminals 418 and 426. The five units shown are interconnected by having the second output terminal of a preceding unit connected to one of the three input terminals of a succeeding unit. For example, the second output terminal 26 of the first unit is connected to the input terminal 112 of the second unit, while the output terminal 126 of the second unit is connected to the input terminal 212 of the succeeding unit 3. In a similar manner, the second output terminal 226 of unit 3 is connected to an input 312 of unit 4 while the second output terminal 326 is connected to the input terminal 412 of last unit 5.

The manner in which the units are interconnected provides two input terminals for each unit for receiving external stimuli except the first which may receive external stimuli on three terminals. Each unit further has a first signal output terminal for providing an output response for the apparatus shown in Figure 1. Unit 5 provides an additional output terminal 426.

It is apparent that the responsive apparatus disclosed in Figure 1 may be comprised of a plurality of units greater or less than the number used for purposes of illustration. Thus the apparatus is capable of modification to accommodate a larger or smaller number of signal input channels.

In operation, signals from an external source may be delivered to input terminals such as 10, 11, 12, 110, 111, 210, 211, 310, 311, 410, and 411 and an output response signal may be received over terminals 18, 118, 218, 318, 418 and 426. To illustrate the type of response that may be derived from the apparatus, consider the following possibilities: If one input signal is delivered to unit 1 an output signal will be delivered to terminal 18. If two input signals are concurrently delivered to the input terminals, a signal will be delivered to output terminal 26. If three concurrent input signals are delivered to unit 1, output signals are delivered to terminals 18 and 26. Unit 2 may receive external signals on either or both input terminals 110 and 111. Whether or not an input signal is received by terminal 112 of unit 2 is determined by the input signals received by unit 1.

With regard to unit 2, one input signal will result in an output on terminal 118, two concurrent input signals will result in an output signal on terminal 126, while three concurrent input signals will deliver output signals to both terminals 118 and 126. The operation of each of the following units, 3, 4, and 5 is similar to that described for units 1 and 2. It is noted that because of the interconnection of the second output terminal of a preceding unit, with one of the input terminals of a succeeding unit, the output of the succeeding unit is determined directly by the unit preceding it and indirectly by all preceding units, as well as by the externally derived stimuli.

It is thus obvious that this apparatus responds uniquely to varying combinations of input signals delivered to it over a plurality of input channels by delivering an output signal group in a plurality of channels characterized by the absence or presence of signals in the various channels.

The apparatus of Figure 1 is particularly useful in connection with equipment employed for electronic numerical computation. The usefulness of this apparatus in this connection may be noted by considering that a group of signals appearing concurrently may bear numeric significance in binary form. For example, if five channels are utilized, the presence of a signal in a particular channel may represent a "one" in a predetermined significant position, while the absence of a signal at that time may be considered to represent a binary zero in said significant position. The following Table I shows the digital significance which may be given to a series of binary numbers:

| Digital number | Binary number |
|---|---|
| 0 | 000000 |
| 1 | 000001 |
| 2 | 000010 |
| 3 | 000011 |
| 4 | 000100 |
| 5 | 000101 |
| 6 | 000110 |
| 7 | 000111 |
| 8 | 001000 |
| 9 | 001001 |
| 20 | 010100 |
| 21 | 010101 |
| 22 | 010110 |
| 23 | 010111 |
| 29 | 011101 |
| 30 | 011110 |
| 50 | 110010 |
| 51 | 110011 |
| 52 | 110100 |

A first group of signals, in accordance with the above table, may be delivered over the first input terminals, 10, 110, 210, 310, and 410, such that the significance of the channel delivering signals to the apparatus increases with the number of the unit associated therewith, that is, input terminal 10 of unit 1 receives the least significant signal of the group, while input terminal 410 of unit 5 receives the most significant signal of the signal group. In a similar manner, a second signal group delivered over five channels may be received by second input terminals 11, 111, 211, 311, and 411 with the least significant signal being delivered to unit 1 and the most significant signal being delivered to unit 5. It is noted that this apparatus will respond by delivering a signal group over the output terminals 18, 118, 218, 318, 418, and 426 representing in binary form the sum of the numbers represented by the two signal groups delivered to the input of the apparatus. In this case, also, the significance of the output signals in the various channels increases with the unit number as represented in Figure 1, so that terminal 18 delivers the least significant signal while terminal 426 delivers the most significant signal of the group. It is noted that the signal group delivered by the apparatus is comprised of six signal combinations delivered over six signal output channels. It is obvious that this is accomplished by utilizing the second output terminal of the last unit 5 for the delivery of signals to the most significant output channel.

Table II illustrates the problem in addition which is graphically illustrated by Figure 3, clearly showing the operation of the apparatus.

| Digital number | Binary equivalent |
|---|---|
| 29 | 011101 |
| 22 | 010110 |
| 51 | 110011 |

The signals delivered to the first input terminals as shown by Figure 3 represent in binary form the decimal number 29 while the signals delivered to the second input terminals represent in binary form the equivalent to decimal number 22, and the signals over the output terminals represent in binary form the decimal number 51. Thus, it is seen that the apparatus has produced output signal representing the sum of the first and second signal input groups.

It will be seen that the output signals are derived in accordance with the characteristics of the apparatus it being noted that an output signal is delivered to terminal 18 in the presence of only one input signal to terminal 10 of unit 1. The second unit delivers an output signal only upon its output terminal 118 in agreement with the receipt of an input signal solely upon the terminal 111. No output signal is delivered to terminal 218 because two concurrent signals are delivered to input terminals 210 and 211 of unit 3. In this case, the second output terminal 226 is energized resulting in the delivery of an input signal to terminal 312 of unit 4. Unit 4 also receives an input signal upon terminal 310 resulting in the absence of an output signal over terminal 318 and the delivery by its second output terminal 326 of an input signal to the terminal 412 of unit 5. Unit 5 receives, therefore, three concurrent signals upon its input terminals 410, 411 and 412 resulting in the delivery of an output signal upon terminal 418 as well as upon the output terminal 426.

While only a few representative embodiments of apparatus for practising the invention disclosed herein have been outlined in detail, there will be obvious to those skilled in the art, many modifications and variations accomplishing the foregoing objects and realizing many or all of the advantages, but which yet do not depart essentially from the spirit of the invention.

What is claimed is:

1. In combination; a first device having first second and third input connections adapted to receive stimuli and first and second output connections, said first output connection being energized upon the occurrence of stimuli singly on any one of said input connections, said second output connection being energized upon the concurrence of stimuli upon any two of said input connections, said first and second output connections being energized upon the concurrence of stimuli on each of said input connections; a second device having first, second and third input connections adapted to receive stimuli and first and second output connections, said first output connections being energized upon the occurrence of stimuli separately on any one of said input connections, said second output connections being energized upon the concurrence of stimuli on any two of said input connections, and said first and second output connections being energized upon the concurrence of stimuli on each of said input connections; and a connection linking said second output connection of said first device with one of said input connections to said second device.

2. In combination; a plurality of devices each comprising first, second and third signal input lines, a buffer device comprising first, second and third input conductors adapted to respectively receive stimuli from said signal input lines and an output conductor, a signal output link energized by the output conductor of said buffer device, a first signal output line connected to said signal output link, a first gating circuit comprising first, second and third input conductors adapted to respectively receive stimuli from said signal input lines and an output conductor, said first gating circuit upon the concurrence of stimuli upon any two of said signal lines energizing said output conductor and inhibiting stimulation of the output conductor of said buffer device, a second signal output line energized by the output conductor of said first gating circuit, and a second gating circuit comprising first, second and third input conductors adapted to respectively receive stimuli from said signal input lines, said second gating circuit upon the concurrence of stimuli on each of said signal input lines energizing said first signal output link; and a plurality of connections respectively between the second signal output line of a preceding one of said devices and one of the signal input lines of a succeeding one of said devices.

3. In combination; a plurality of devices each comprising, first, second and third signal input lines, first, second and third buffer valves, each comprising a first control electrode connected to a respective one of said signal input lines a second control electrode and an output electrode, first and second signal input valves each having first and second control electrodes and an output electrode, a first connection between the output electrodes of said buffer valves and the first control electrodes of said signal input valves, a first signal output line connected to the output electrodes of said signal input valves, first, second and third gating valves each comprising first and second control electrodes respectively connected with two of said signal input lines in differing combinations and an output electrode, a second connection between the second control electrodes of said buffer valves and the output electrodes of said gating valves, a second signal output line connected to the output electrodes of said gating valves, a first coincidence valve comprising first and second control electrodes respectively connected to said first and second signal input lines and an output electrode connected with the second control electrode of said first signal input valve, and a second coincidence valve comprising first and second control electrodes respectively connected to said second and third signal input lines and an output electrode connected to the second control electrode of said second signal input valve; and a plurality of operative connections respectively between the second signal output line of a preceding one of said devices and one of the signal input lines of a succeeding one of said devices.

4. In combination; a first device having at least first and second input connections adapted to receive stimuli and first and second output connections, said first output connection being energized upon the occurrence of stimuli singly on any one of said input connections, and said second output connection being energized upon the concurrence of stimuli upon both of said input connections; a second device having first, second and third input connections adapted to receive stimuli and first and second output connections, said first output connection being energized upon the occurrence of stimuli singly on any one of said input connections, said second output connection being energized upon the concurrence of stimuli upon any two of said input connections, and said first and second output connections being energized upon the concurrence of stimuli on each of said input connections, and a connection linking said second output connection of said first device with one of said input connections to said second device.

JOHN PRESPER ECKERT, Jr.
JOHN W. MAUCHLY.

References Cited in the file of this patent

UNITED STATES PATENTS

| Number | Name | Date |
| --- | --- | --- |
| 2,464,353 | Smith et al. | Mar. 15, 1949 |